3,006,927
METHOD OF MAKING HYODESOXY-
CHOLIC ACID
Horst Liebig, Berlin-Zehlendorf, Germany, assignor to Riedel-de Haen, A.G., Seelze, near Hannover, Germany
No Drawing. Filed May 11, 1961, Ser. No. 109,250
Claims priority, application Germany May 27, 1960
16 Claims. (Cl. 260—397.1)

The present invention relates to a process for the isolation of hyodesoxycholic acid from crude mixtures of bile acids. As crude bile acid mixtures there may be considered, in particular, the crude products obtained by the saponification of pig bile. However, other crude bile acid mixtures which contain hyodesoxycholic acid are also of use for the process.

Previously, hyodesoxycholic acid has been obtained by saponifying pig bile, adjusting the mixture to a pH value of 8, adding an organic solvent, such as ethyl acetate, and subsequently reducing the pH value to 5. A hyodesoxycholic acid can then be isolated from the ethyl acetate layer which contains considerable amounts of impurities. Therefore, the so-obtained acid must be subjected to a purification by means of a very careful recrystallization which takes place with considerable losses. Furthermore, in the case of this known process, the temperature as well as the pH value must be very accurately maintained. It is also a disadvantage of the process that it can only be carried out using ethyl acetate as organic solvent, to give yields of 2% by weight, referred to the amount of pig bile used. Since ethyl acetate is relatively easily soluble in water and is also subject to hydrolysis, the recovery of the solvent is rendered more difficult.

It is also known to precipitate the crude bile acids from saponified pig bile with acids, to remove the water therefrom with benzene and to convert them with methanolic hydrochloric acid into esters. A hyodesoxycholic acid ester-benzene adduct can then be isolated from the benzene solution. The process only yields 1–1.2% by weight of hyodesoxycholic acid, referred to the pig bile. Instead of benzene, carbon tetrachloride or toluene can also be used. The low yields which the known process gives may be caused by the fact that the solubility ratios of the adducts there used are not particularly favorable.

It has now been found that hyodesoxycholic acid can be isolated in good yields from crude bile acid mixtures, and particularly from saponified pig bile, when the crude bile acid mixture is subjected to an esterification, the ester mixture thus obtained dissolved in an alkyl ether containing 4 to 8 carbon atoms, an aromatic amine of the general formula:

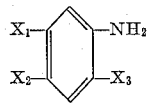

in which $X_1$, $X_2$ and $X_3$ are hydrogen atoms and/or alkyl radicals and $X_1$ and $X_2$ can together signify a fused benzene ring, added to the solution, the hyodesoxycholic acid ester-amine adduct thereby precipitated is decomposed and the hyodesoxycholic acid ester saponified. In this manner, all the other materials in the pig bile and all the other bile acids except hyodesoxycholic acid remain in solution. The hyodesoxycholic acid-amine adduct obtained is so constituted that by the decomposition of the adduct, for example by alkali saponification and steam distillation, a pure hyodesoxycholic acid can be directly isolated. The yields are good and, in the case of using pig bile, lead to 2.4% by weight of hyodesoxycholic acid. In particular, the solubility ratios of the hyodesoxycholic acid ester-$\beta$-naphthylamine adduct in an alkyl ether, and especially in di-isopropyl ether, are very favorable. Furthermore, it is advantageous that by the decomposition of this adduct, for example by boiling with aqueous sodium hydroxide solution, the $\beta$-naphthylamine, perhaps by cooling of the solution, is obtained in crystalline form and can be isolated by filtering with suction and used again.

As aromatic amines for adduct formation there may be employed both amines of the benzenes series and the naphthalene series. Examples of amines of the benzene series include aniline, and alkyl derivatives of aniline, such as the toluidines, for example, o-, m-, or p-toluidine, xylidines, such as o-, m-, and p-xylidine, ethylanilines, such as o-, m-, and p-ethylaniline, and propylanilines, such as o-, and p-propylaniline. Examples of amines of the naphthalene series include α- and β-naphthylamine, and alkylnaphthylamines, such as, for example, 3-alkyl-$\beta$-naphthylamines, for example 3-methyl-$\beta$-naphthylamine.

As alkyl ethers for dissolving the ester mixture, there may be employed lower aliphatic ethers, particularly such ethers containing from 4 to 8 carbon atoms, for example, di-n-propyl ether, diethyl ether, di-n-butyl ether, di-isobutyl ether, di-tert.-butyl ether, but di-isoproyl ether is preferred. Corresponding mixed aliphatic ethers with different alkyl groups can also be used, such as, for example, ethyl-isopropyl ether, ethyl-n-butyl ether, and n-butyl-tert.-butyl ether.

The alkyl ethers may be diluted with an organic solvent which is miscible with them. As such solvents there are used aromatic hydrocarbon solvents, particularly benzene, toluene, and xylene.

For the esterification of the crude bile acids, any suitable alcohol may be used, but lower aliphatic alcohols are preferred for this purpose, for example, methanol, ethanol, n-propanol, or isopropanol, but particularly methanol.

It has proved to be favorable so to adjust the solution of the aromatic amine that the total weight of the ester mixture and of the solvent amounts to 10–15% by weight of the pig bile introduced or amounts to 1.5–2 times the weight of the dry residue of the saponified pig bile. The amount of aromatic amine for adduct formation lies between about 1 and 1.5 mols per mol hyodesoxycholic acid.

If, in the case of using the process according to the present invention, pig bile is used as starting material, then this is saponified, according to known methods, the saponification solution is evaporated and the residue obtained esterified. However, the bile acids, together with a number of accompanying materials, can also be precipitated from the saponification solution by the addition of acids, the aqueous phase separated off and the precipitate used directly for the esterification.

The following examples are given for the purpose of illustrating the present invention, it being understood that the invention is not limited thereby.

*Example 1*

2 liters (2.1 kg.) pig bile are heated with 250 g. 34–35% sodium hydroxide solution in an autoclave for five hours at 135–136° C. 340 ml. 38% hydrochloric acid are then added to the cooled and substantially clear solution. The semi-solid precipitated crude acids and accompanying material are separated from the solution and superficially washed with water.

1.15 liters methanol are then added, followed by 37.5 g. concentrated sulphuric acid. After standing overnight, 100 g. anhydrous sodium carbonate are added, with stirring. The salts which separate out are filtered off with suction and subsequently washed with 250 ml. methanol. The filtered ester solution is then concentrated to 430 g. 400 ml. water and 400 ml. di-isopropyl ether are then added to the residue in the reaction vessel and well stirred. The aqueous phase is subsequently separated off and the ether layer washed with dilute sodium carbonate solution and then with water. The ethereal layer is dried with anhydrous sodium sulphate and then concentrated to 278 g. After the addition of 20 g. aniline, the solution is set aside in order to crystallize. After standing for two hours, the crystalline slurry is filtered off with suction and washed with 150 ml. di-isopropyl ether containing 2% aniline.

The filtered residue is then boiled under reflux for half an hour with 190 ml. di-isopropyl ether containing 2% aniline. After cooling, the reaction mixture is again filtered with suction and subsequently washed with 150 ml. di-isopropyl ether containing aniline.

After drying in air, 64.6 g. hyodesoxycholic acid-aniline adduct are obtained; M.P. 133–133.5° C.

This adduct is mixed with 11 g. sodium hydroxide solution and 200 ml. water and steam passed through the solution until all of the aniline has distilled over. The solution is then added dropwise to 290 ml. warm 1 n hydrochloric acid. The hyodesoxycholic acid which separates out is filtered off with suction, washed with water and dried at 60–70° C.

Yield: 50.13 g. hyodesoxycholic acid; M.P. 197–198° C., referred to 1 kg. of pig bile the yield is 2.35% by weight and referred to 1 liter of pig bile is 2.5%.

Instead of precipitating the crude acids, together with accompanying materials, by the addition of acid as described in paragraph 1, the alkaline saponification solution can also be evaporated, the residue sieved, and subsequently dried for four hours at 115° C.

The hydrochloric acid residue obtained, which amounts to about 344 g., is then introduced into a mixture of 1.2 liters methanol and 159 g. concentrated sulphuric acid. After standing overnight, 41 g. anhydrous sodium carbonate are added with stirring and the mixture subsequently further worked up in the manner described above.

*Example 2*

2 liters (2.1 kg.) pig bile are heated with 250 g. 34–35% sodium hydroxide solution in an autoclave for five hours at 135–136° C. 340 ml. 38% hydrochloric acid are added to the cooled, substantially clear solution. The semi-solid precipitated crude acids and accompanying material are separated from the solution and superficially washed with water. 1.15 liters methanol are then added, followed by 37.5 g. concentrated sulphuric acid. After standing overnight, 100 g. anhydrous sodium carbonate are added, with stirring. The salts which separate out are filtered off with suction and washed with 250 ml. methanol. The filtered crude ester solution is then concentrated to 440 g. 400 ml. water and 400 ml. di-isopropyl ether are added to the residue in the reaction vessel and thoroughly mixed. The aqueous phase is subsequently separated off and the ethereal layer washed with dilute sodium carbonate solution and then with water. The ethereal layer is concentrated to 270 g. 30 g. β-naphthylamine and 50 ml. di-isopropyl ether are then added. After standing for five hours, the crystalline slurry formed is filtered off with suction, whereby the oily constituents are also removed as far as possible. The residue is boiled for half an hour with 210 ml. di-isopropyl ether. After cooling to room temperature, the residue is again filtered and washed with 120 ml. di-isopropyl ether. After drying in air, 71.8 g. hyodesoxycholic acid methyl ester-β-naphthylamine adduct of M.P. 136–137.5° C. are obtained. The solubility of the adduct at 23° C. in di-isopropyl ether is 0.39 g. per 100 ml. solution and in diethylether is 0.82 g. per 100 ml. solution. This adduct can then be worked up to give hyodesoxycholic acid in the manner described in the following example.

*Example 3*

Pig bile is subjected to alkaline saponification as described in Example 2 in order to destroy all the ester bonds of the bile acids. The crude bile acids are precipitated by the addition of acid and are then converted into the methyl ester in methanolic solution. Most of the methanol is then distilled off to give a methanol-containing residue. 203 kg. of this residue are dissolved in 336 kg. benzene. The benzene solution is washed with water which initially can be alkaline (pH value of 8.5–9) and then neutral. 14.3 kg. β-naphthylamine (technical) are added to the benzene solution, 302 kg. benzene distilled off and then, immediately afterwards, 38 kg. di-isopropyl ether are added. After cooling, the hyodesoxycholic acid methyl ether-β-naphthylamine adduct crystallizes out. After purification and drying as in Example 2, 33.0 kg. of the adduct are obtained.

33.0 kg. of adduct are heated for three hours, with stirring, with 190 kg. water and 8.9 kg. potassium hydroxide, followed by dilution with 145 kg. water. After standing overnight, the β-naphthylamine which has crystallized out is filtered off with suction. After purification, 7.5 kg. β-naphthylamine are recovered which can be used again.

130 kg. 5% hydrochloric acid are used for the precipitation of the hyodesoxycholic acid from the potassium salt of hyodesoxycholic acid formed by the above-described splitting and esterification. By heating to about 75° C., the hyodesoxycholic acid agglomerates and can be isolated. After washing and drying, 23.6 kg. hyodesoxycholic acid are obtained.

It will be understood that the above description of the present invention is susceptible to various modifications, changes, and adaptations, and the same are intended to be comprehended within the meaning and range of equivalents of the appended claims.

What is claimed is:

1. Process for the isolation of hyodesoxycholic acid from crude bile acid mixtures which comprises the steps of esterifying a crude bile mixture, dissolving the resulting ester in an alkyl ether containing from 4 to 8 carbon atoms, adding to the ether solution an aromatic amine having the formula:

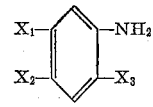

in which $X_1$, $X_2$ and $X_3$ are selected from the group consisting of hydrogen and an alkyl group, and a fused benzene ring formed by $X_1$ and $X_2$, to precipitate therefrom an ester-amine adduct of hyodesoxycholic acid, separating said ester-amine adduct, treating said adduct with alkali to liberate the ester, and acidifying to recover the hyodesoxycholic acid.

2. The process of claim 1 in which the crude bile acid mixture is esterified with a lower aliphatic alcohol.

3. The process of claim 2 in which the alcohol is methanol.

4. The process of claim 1 in which the alkyl ether is a lower dialkyl ether.

5. The process of claim 4 in which the ether is di-isopropyl ether.

6. The process of claim 1 in which the crude bile acid esterification product is dissolved in an alkyl ether containing from 4 to 8 carbon atoms together with an aromatic organic solvent.

7. The process of claim 6 in which the solvent is benzene.

8. The process of claim 1 in which the aromatic amine is aniline.

9. The process of claim 1 in which the aromatic amine is beta-naphthylamine.

10. The process of claim 1 in which the crude bile acid mixture is one obtained by saponification of pig bile.

11. The process of claim 10 in which the solution obtained by saponification of the pig bile is evaporated and the residue thus obtained is esterified.

12. The process of claim 10 in which the bile acids and accompanying materials are precipitated from the solution obtained by the saponification of pig bile by the addition of an acid, the aqueous phase is removed and the precipitate is then esterified.

13. The process of claim 1 in which the solution of the ester mixture is adjusted before the addition of the aromatic amine so that the total weight of the ester mixture and of the solvent amounts to about 10–15% by weight of the bile starting material.

14. The process of claim 13 in which the bile is pig bile.

15. The process of claim 1 in which the solution of the ester mixture is adjusted before the addition of the aromatic amine so that the total weight of the ester mixture and of the solvent amounts to about 1.5 to 2.0 times the dry weight of the dry residue of the saponified bile.

16. The process of claim 15 in which the bile is pig bile.

References Cited in the file of this patent

Fieser et al.: "Steroids" (1959), Reinhold Publishing Corp., p. 422.